US011110840B1

(12) United States Patent
Hunt et al.

(10) Patent No.: US 11,110,840 B1
(45) Date of Patent: Sep. 7, 2021

(54) LATCHING DEVICE FOR MOTOR VEHICLE APPLICATIONS

(71) Applicant: Kiekert AG, Heiligenhaus (DE)

(72) Inventors: Robert J. Hunt, Davisburg, MI (US); Robert S. Pettengill, Farmington, MI (US)

(73) Assignee: Kiekert AG, Heiligenhaus (DE)

( * ) Notice: Subject to any disclaimer, the term of this patent is extended or adjusted under 35 U.S.C. 154(b) by 28 days.

(21) Appl. No.: 16/860,622

(22) Filed: Apr. 28, 2020

(51) Int. Cl.
*B60N 2/90* (2018.01)
*B60N 2/22* (2006.01)

(52) U.S. Cl.
CPC ........... *B60N 2/933* (2018.02); *B60N 2/2245* (2013.01); *B60N 2/938* (2018.02); *B60N 2002/952* (2018.02); *B60N 2002/971* (2018.02)

(58) Field of Classification Search
None
See application file for complete search history.

(56) References Cited

U.S. PATENT DOCUMENTS

| | | | |
|---|---|---|---|
| 6,733,078 B1 * | 5/2004 | Zelmanov ............ | B60N 2/2245 292/201 |
| 8,882,160 B2 | 11/2014 | Kamata | |
| 2013/0259565 A1 * | 10/2013 | Hanaki ................ | B60N 2/2245 403/376 |
| 2016/0009202 A1 * | 1/2016 | Pejathaya ............. | B60N 2/366 297/378.13 |
| 2020/0223330 A1 * | 7/2020 | Zhuang ................ | B60N 2/2245 |
| 2021/0122268 A1 * | 4/2021 | Noguchi .............. | B60N 2/6009 |

FOREIGN PATENT DOCUMENTS

| | | | |
|---|---|---|---|
| EP | 2657067 B1 | 11/2018 | |
| WO | WO-2006132018 A1 * | 12/2006 | ............ B60N 2/919 |
| WO | 2019224672 A1 | 11/2019 | |

* cited by examiner

*Primary Examiner* — David E Allred
(74) *Attorney, Agent, or Firm* — Renner, Otto, Boisselle & Sklar, LLP

(57) ABSTRACT

A latching device for motor vehicle applications, in particular to a multi-position backrest latch for locking and unlocking seat backrests in motor vehicles. The basic structure of the device has a locking mechanism substantially consisting of a catch and pawls, and also has a locking pin that interacts with the locking mechanism, and a cam element, which acts upon the locking pin in the direction of an open position. According to the invention, the cam element acts on a blocking element which engages over the locking pin.

19 Claims, 3 Drawing Sheets

H
1
5
4
12
6
7
3
2
8

H
15
10
9
14
13
11
2
2
16
12

LATCHING DEVICE FOR MOTOR VEHICLE APPLICATIONS

FIELD OF INVENTION

The invention relates to a latching device for motor vehicle applications, in particular to a multi-position backrest latch for locking and unlocking seat backrests in motor vehicles, comprising a locking mechanism substantially consisting of a catch and pawl, further comprising a locking pin that interacts with the locking mechanism, and comprising a cam element, which acts upon the locking pin in the direction of an open position.

BACKGROUND OF INVENTION

Latching devices and in particular backrest latches for seat backrests in motor vehicles are described in detail in WO 2019/224672 A1, for example. By means of an opening drive that is additionally provided at this point, the overall safety and functionality can be improved. The backrest latch is usually attached and placed on or in the seat backrest, typically a rear seat backrest in the motor vehicle. By contrast, the locking pin is usually found on the body side or is connected to the body in a stationary manner. In principle, this can also be done in reverse.

For backrest latches, in particular for comfort and noise reduction, it must be ensured that deformations due to any play between the locking pin on the one hand and the locking mechanism on the other hand is reduced to a minimum. Such play can be attributed to manufacturing and/or assembly tolerances, for example.

For this reason, the prior art according to EP 2 657 067 B1 already proposes a locking device for locking a seat of a vehicle relative to a striker. The known teaching uses a special catch, which interacts with the pawl. For this purpose, the catch has a casing which can be deformed by the striker.

In the generic prior art according to U.S. Pat. No. 8,882,160 B2, a cam element is provided which acts upon the locking mechanism in the direction of a closed position once an opening force is acting on the locking mechanism. As a result, undesirable movements of the locking pin are prevented overall.

The known teaching has proven itself for single position backrests. The cam element ultimately acts on the catch via the pawl pressing it to a fixed casing. A movable element is required in place of the fixed casing if the backrest latch is to provide for two or more comfort adjustment positions. Here, the invention aims to provide a total remedy.

SUMMARY OF INVENTION

The invention addresses the technical problem of developing such a latching device for motor vehicle applications so that manufacturing and assembly tolerances are controlled properly and the locking pin is securely blocked in order to be able to reliably absorb loads, in particular those due to vehicle vibrations in two or more positions.

To solve this technical problem, a latching device of the type in question in the context of the invention is characterized in that the cam element acts on a movable blocking element which engages over the locking pin.

In the context of the invention and contrary to the generic teaching according to U.S. Pat. No. 8,882,160 B2, the backrest latch provides for two or more locking pin engagement positions. The cam element further ensures that a blocking element which engages over the locking pin is acted on, and therefore the blocking of the locking pin is ultimately brought about by an additional blocking element, in conjunction with the catch. The blocking element in particular ensures blocking that is independent of the pawl on the part of the locking pin caught in the catch. This is advantageous since it may be shifted out of the way temporarily for the locking pin to attain another position altering the angle of the backrest. Used in conjunction with a multi-pawl locking mechanism comprising a comfort pawl and a blocking pawl that secures the comfort pawl can be used. Thereby as the locking pin is fixed on the one hand by the interior of a multi position insertion slot in the catch on one hand and by the additional blocking element, which engages over the locking pin on the other hand fixing the backrest rigidly in position.

As a result, the locking pin is securely fastened in the interior of the insertion slot in the catch in multiple positions. With the catch and pawl mechanism providing a fixed backstop in the opening direction, the blocking element ensures a rigid locking pin position regardless of climate conditions, component variances, or backrest positions. The essential advantages can be seen here.

According to an advantageous embodiment, the cam element is mounted on the blocking element for this purpose. The blocking element is in turn rotatably mounted in a latch case, which is also used for the rotatable mounting of both the catch and the pawl or the two pawls. The latch case further provides a stationary control curve for the cam element to engage.

In addition, the design is advantageously such that the cam element is rotatably connected to the blocking element on the head side. That is to say, the cam element is rotatably connected to the blocking element, specifically at its head end, i.e. opposite the axis of the blocking element, therefore so as to be remote from the axis.

In order to generate the desired pivoting movement of the cam element, it usually has a control link. The design is usually such that the control link of the cam element engages in an elongate hole in the blocking element. It has also proven itself in this connection if the control link rests on a spring and is acted upon in this way by means of the spring in question.

The spring may be a spring that acts on both the control link and the blocking element. In other words, the spring assumes a dual function, on the one hand to act on the control link and on the other hand to act on the blocking element.

To actuate the cam element, a stationary control curve that interacts with the cam element is generally provided. That is to say, the cam element that is moved together with the blocking element is supported on this control curve. Any pivoting movements of the cam element relative to its axis arranged on the head side on the blocking element are transmitted to the stationary control curve and as a result ultimately acts on the blocking element. In fact, in this context, the design is such that action of the locking element on the part of the locking pin in the locking mechanism in the direction opening the locking mechanism corresponds to the fact that the spring loaded control link, the connected cam element and the control curve that interacts with the cam element exert an opposing and opening force on the locking element. That is to say, the cam element acts upon the blocking element in an opening direction when a closing force is applied to the locking mechanism. The opening force applied against the locking mechanism ultimately provides a clamping effect on the locking pin, which results in particularly rigid and quiet gap-free operation for comfort.

The blocking element itself is generally designed as an L-shaped or F-shaped blocking lever. The locking mechanism is advantageously a multi position locking mechanism. By using the additional blocking element or the L-shaped or F-shaped blocking lever, a backrest latch is made available overall which can feature multiple comfort positions without rattle. Nevertheless, the backrest latch in question is securely anchored relative to the body in the locked state in any of the available positions. All of this is possible using a structurally simple and reliable construction, so that particular advantages are achieved compared with the prior art.

BRIEF DESCRIPTION OF DRAWINGS

The invention is explained in greater detail in the following with reference to drawings, which show just one embodiment. In the drawings.

DETAILED DESCRIPTION OF DRAWINGS

Figure 1:
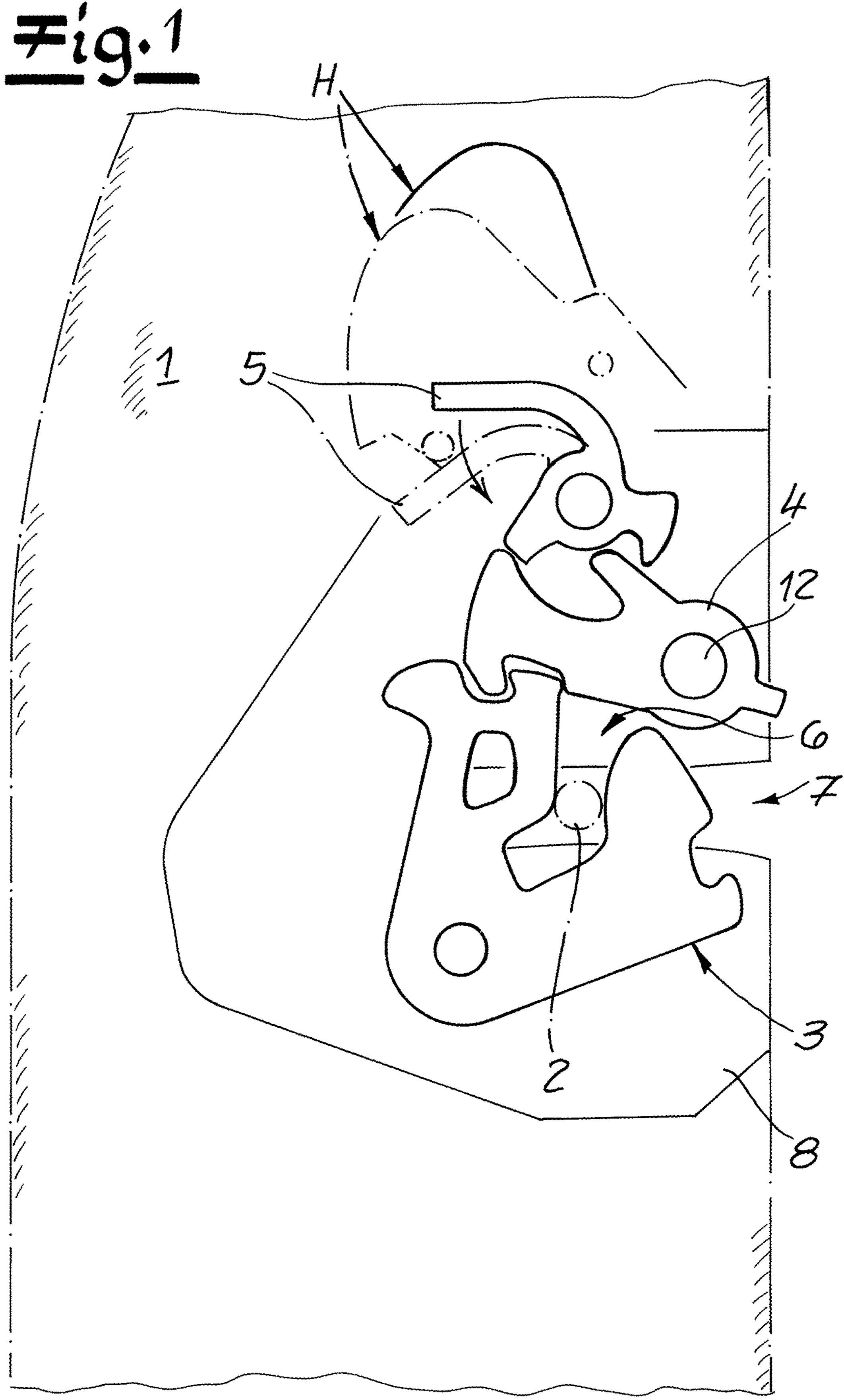
FIG. 1 is an overview of the latching device according to the invention.
Figure 2:
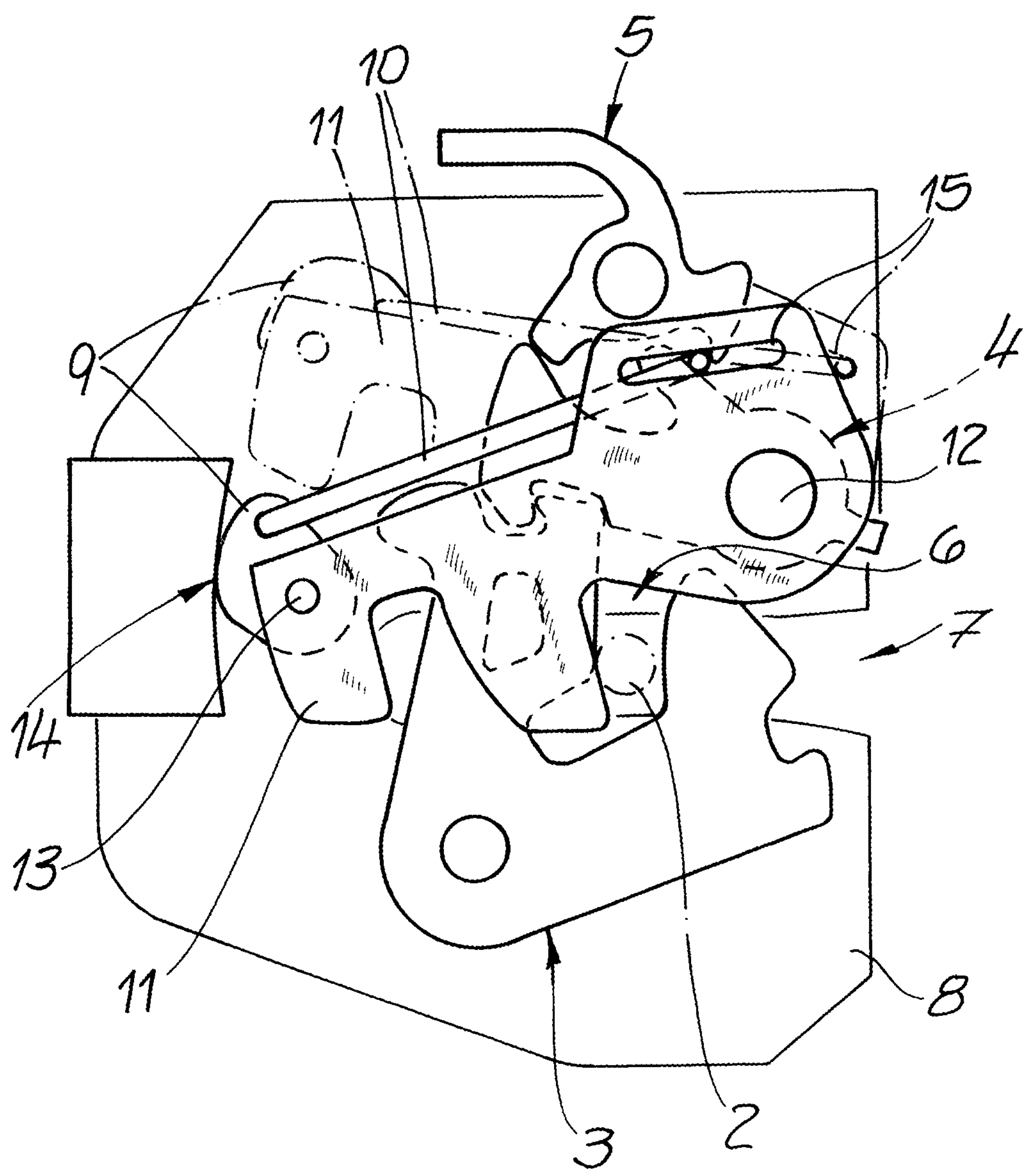
FIG. 2 shows the latching device in the closed or locked state with a fixed locking pin and FIG. 3 shows the subject matter according to FIG. 2 during an opening process.

In the drawings, a latching device for motor vehicle applications is shown. In fact, in the context of the exemplary embodiment, this is a backrest latch for locking and unlocking a seat backrest 1, which is only shown in FIG. 1, in the interior of a motor vehicle. For this purpose, the backrest latch, which is typically attached in or on the seat backrest 1 in question, interacts with a locking pin 2 fixed to the body.

In detail the pawl 4 interacts with the catch 3, using multiple sets of lugs and recesses which engage in one another. In addition, the catch 3 has an insertion slot 6 which accommodates the locking pin 2 and is L-shaped according to the exemplary embodiment.

To latch the locking mechanism 3, 4, 5, the locking pin 2 moves into an inlet opening 7 in a striking plate or latch case 8. The striking plate or latch case 8 is made of solid metal and is used both for mounting the catch 3 as well as the comfort pawl 4 and finally the blocking pawl 5. For this purpose, all of the above-mentioned elements 3, 4, 5 of the multi-pawl locking mechanism 3, 4, 5 are equipped with respective bearing bolts anchored in the striking plate or latch case 8. According to the exemplary embodiment, the relevant bearing bolts are arranged at a distance from one another and extend substantially perpendicularly relative to the plane of the figure.

Figure 3:
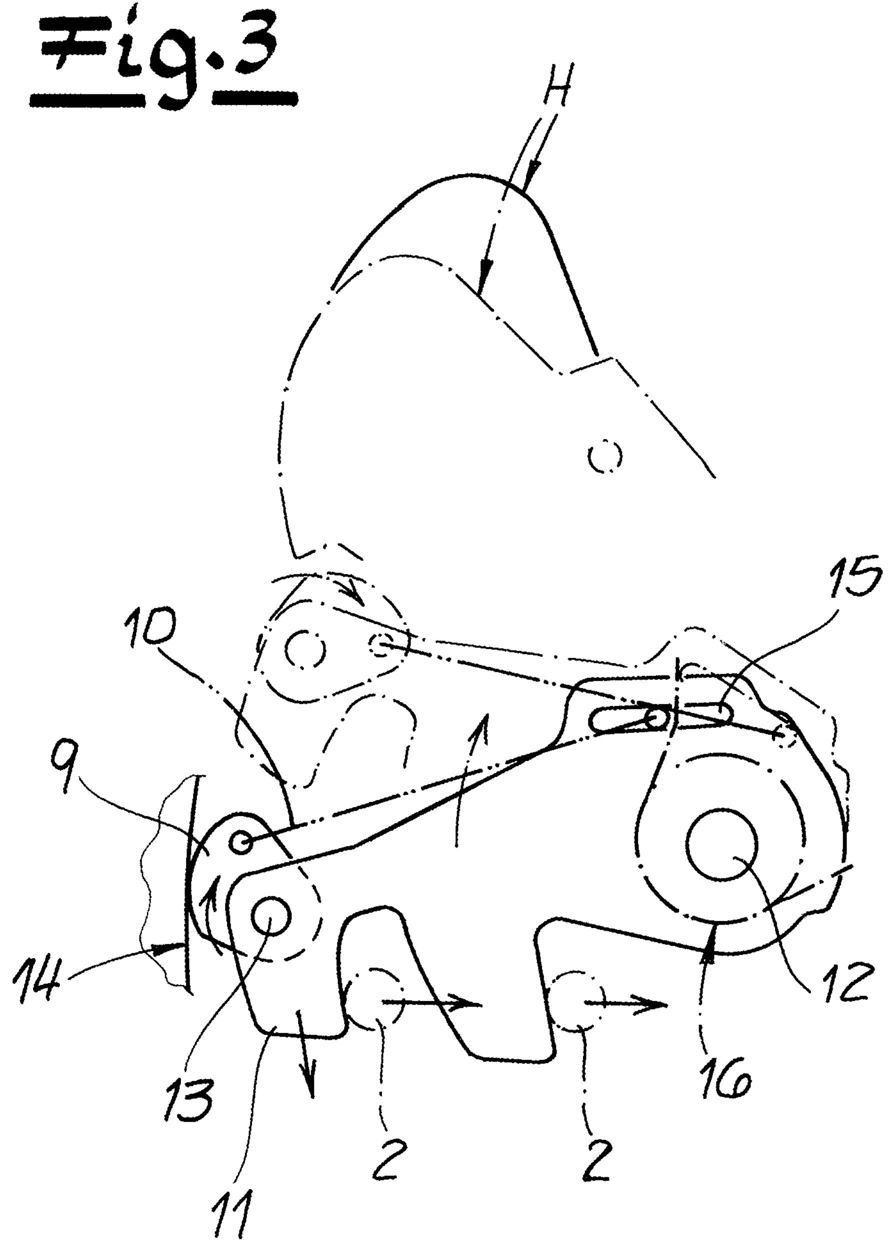

In FIG. 1, a handle H is shown, by means of which the blocking pawl 5 can be pivoted from the closed position according to FIG. 1 in the counterclockwise direction, so that the blocking pawl 5 releases the comfort pawl 4, which in turn leaves the latching engagement of the catch 3, so that the catch 3 can pivot clockwise and releases the previously caught locking pin 2. The end effect of this is shown in FIG. 3.

The basic structure also includes a cam element 9, 10, which acts on a blocking element 11 which engages over the locking pin 2. This applies at least to the locking mechanism 3, 4, 5 in one of the multiple closed states. The cam element 9, 10 is composed in detail of a cam 9 and a control link 10 acting on the cam 9.

In fact, according to the invention, the cam element 9, 10 is mounted on the blocking element 11. In the context of the exemplary embodiment, the blocking element 11 is an L-shaped or F-shaped blocking lever 11. According to the exemplary embodiment, the blocking lever 11 is mounted on axis 12.

In addition, the design is such that the cam element 9, 10 is rotatably connected to the blocking element or the blocking lever 11. In fact, at this point, there is an associated axis of rotation 13 of the cam element 9, 10 or its cam 9 on the head side of the blocking lever 11, at the end thereof remote from the axis opposite the axis 12 supporting the blocking lever 11. In this case, the cam 9 of the cam element 9, 10 rests against a stationary control curve 14, against which the cam 9 is supported. According to the exemplary embodiment, the stationary control curve 14 is connected to the striking plate 8.

The control link 10 engages in an elongate hole 15 in the blocking element or blocking lever 11. It can also be seen that the control link 10 rests on a spring 16. According to the exemplary embodiment, the spring 16 is designed as a leg spring and, with its leg base, surrounds the axis 12 of the blocking lever 11. The spring or leg spring 16 rests, with one leg end, on the end of the control link 10 and ensures that the control link 10 is acted upon in the direction of the stationary control curve 14. Simultaneously, with the spring leg end of the control link 10 constrained in slot 15 of the blocking lever 11, the blocking lever 11 is pushed into engagement with the locking pin 2, according to the exemplary embodiment, in a counterclockwise direction relative to the axis 12.

The force of the spring 16 acts on the blocking lever 11 in contact with the locking pin 2, so that the locking pin 2 is both clamped in the insertion slot 6 in the catch 3 and is clamped in the insertion slot 6 by means of the blocking lever 11. Additionally, the spring 16 acting through the control link 10 presses the cam 9 into the stationary control curve 14 with the cam 9 mounted on the end of the blocking lever 11 driving the blocking lever 11 more so into the locking pin 2.

When force is applied to the locking pin 2 in the closing direction, the blocking lever 11 is acted upon counter to the force of the spring 16 in a clockwise direction relative to its axis 12, as indicated by an arrow. This clockwise action of the blocking lever 11 in the closing direction is additionally resisted by the cam 9 in contact with the stationary control curve 14. The stationary control curve 14 features a contour that gets closer to the cam 9 pivot axis 13 as the blocking lever 11 rotates away from the locking pin 2. This requires that the cam 9 must rotate away from the stationary control curve 14 in order for the blocking lever 11 to rotate away from the closing direction locking pin 2. This transitions much of the locking pin 2 closing direction force into the stationary control curve 14 and the blocking lever axis 12

That is to say, when force is applied to the locking pin 2 or the locking mechanism 3, 4, 5 in the opening direction, the locking mechanism 3, 4, 5 in question is secured effectively as the opening force increases. Conversely as force is applied to the locking pin 2 in the closing direction, a self-closing effect of the blocking lever is observed until the sum of forces exceeds the cam blocking which is greatly in excess of the original spring 16 input force.

In order to open the motor vehicle latch or backrest latch, the handle H shown in FIGS. 1 and 3 is provided. In fact, during an opening process, the handle H acts on the end of the control link 10 projecting perpendicularly to the plane of the figure so that the cam 9 is pivoted about its axis 13 in the clockwise direction by means of the control link 10. As a result, the cam 9 is released from the stationary cam curve 14, so that as a result the blocking lever 11 also follows the clockwise movement on the part of the handle H. This also means that the blocking pawl 5 that interacts with the handle H is pivoted counterclockwise and releases the comfort pawl 4 as previously described. As a result, the catch 3 is released from the comfort pawl 4 and can then pivot open (in a spring-assisted manner) in the clockwise direction. As a result, the locking pin 2 can leave the insertion slot 6 in the catch 3 and the associated seat backrest 1 can be folded down in the example given.

LIST OF REFERENCE SIGNS

1 seat backrest
2 locking pin
3 catch
4 comfort pawl
5 blocking pawl
3, 4, 5 locking mechanism
6 insertion slot
8 striking plate
9 cam
10 control link
11 blocking lever/element
12 axis
13 axis of rotation
14 control curve
15 elongate hole
16 leg spring

The invention claimed is:

1. A latching device for motor vehicle applications the latching device comprising:
- a locking mechanism having a catch and pawl,
- a locking pin that interacts with the locking mechanism, and
- a cam element which acts upon the locking mechanism in a direction of an open position, and
- a blocking element, wherein the cam element acts on the blocking element which engages over the locking pin;
- wherein the cam element is rotatably connected to the blocking element on a head side of the blocking element.

2. The latching device according to claim 1, wherein the cam element comprises a control link.

3. The latching device according to claim 1 further comprising a stationary control curve that interacts with the cam element.

4. The latching device according to claim 3, wherein the stationary control curve is formed on a latch case.

5. The latching device according to claim 3, wherein the stationary control curve has a contour that is configured to be closer to a pivot axis of the cam element when the blocking element rotates away from the locking pin.

6. The latching device according to claim 1, wherein the blocking element is formed as an L-shaped or F-shaped blocking lever.

7. The latching device according to claim 1, wherein the locking mechanism is a multi-position locking mechanism comprising a comfort pawl that secures the catch and a blocking pawl that interacts with the comfort pawl.

8. The latching device according to claim 7 further comprising a latch case, wherein the catch, the comfort pawl, and the blocking pawl are mounted on the latch case.

9. The latching device according to claim 8, wherein the latch case has an inlet opening that receives the locking pin to latch the locking mechanism.

10. The latching device according to claim 3, wherein the head side of the blocking element is at an end of the blocking element that is remote from an axis of rotation of the blocking element.

11. The latching device according to claim 1, wherein the latching device is arranged in a backrest latch and the locking pin has at least two locking pin engagement positions in which the locking pin is fastened in an insertion slot of the catch.

12. A latching device for motor vehicle applications comprising comprising:
- a locking mechanism having a catch and pawl,
- a locking pin that interacts with the locking mechanism, and
- a cam element which acts upon the locking mechanism in a direction of an open position, and
- a blocking element, wherein the cam element acts on the blocking element which engages over the locking pin,
- wherein the cam element comprises a control link, and wherein the control link engages in an elongated hole in the blocking element.

13. The latching device according to claim 12, wherein the cam element is mounted on the blocking element.

14. The latching device according to claim 12, wherein the control link rests on a spring.

15. The latching device according to claim 14, wherein the spring acts on both the control link and the blocking element through the elongated hole.

16. The latching device according to claim 15, wherein the blocking element is simultaneously pushed into engagement with the locking pin when the control link is constrained in the elongated slot of the blocking element.

17. The latching device according to claim 14, wherein the spring is a leg spring having a leg base that surrounds an axis of the blocking element.

18. A latching device for motor vehicle applications comprising comprising:
- a locking mechanism having a catch and pawl,
- a locking pin that interacts with the locking mechanism, and
- a cam element which acts upon the locking mechanism in a direction of an open position, and
- a blocking element, wherein the cam element acts on the blocking element which engages over the locking pin,
- wherein the cam element comprises a control link, and wherein the control link is an elongated component having a first end connected to the cam and an opposite end that engages in an elongated hole formed in the blocking element.

19. The latching device according to claim 18, wherein the opposite end of the control link is movable along the elongated hole.

* * * * *